(12) United States Patent
Wang (10) Patent No.: US 7,292,017 B2
(45) Date of Patent: Nov. 6, 2007

(54) CAPACITOR INSULATING POWER SUPPLY

(75) Inventor: Guo-Hua Wang, Yamatokohriyama (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 10/582,870

(22) PCT Filed: Dec. 18, 2003

(86) PCT No.: PCT/JP03/16214

§ 371 (c)(1),
(2), (4) Date: Jun. 14, 2006

(87) PCT Pub. No.: WO2005/062452

PCT Pub. Date: Jul. 7, 2005

(65) Prior Publication Data

US 2007/0120541 A1      May 31, 2007

(51) Int. Cl.
*G05F 1/40* (2006.01)
(52) U.S. Cl. ..................................... 323/282
(58) Field of Classification Search ................. 323/222, 323/224, 282, 283, 284, 351
See application file for complete search history.

(56) References Cited

U.S. PATENT DOCUMENTS

| | | | |
|---|---|---|---|
| 4,635,175 A | 1/1987 | Probst | |
| 5,929,692 A * | 7/1999 | Carsten | ....................... 327/531 |
| 6,144,565 A | 11/2000 | Lethellier | |
| 6,362,979 B1 | 3/2002 | Gucyski | |
| 6,369,559 B1 * | 4/2002 | Ashrafzadeh | ............... 323/283 |
| 6,437,999 B1 * | 8/2002 | Wittenbreder | ................. 363/39 |
| 6,541,925 B1 | 4/2003 | Chang et al. | |
| 6,563,718 B1 | 5/2003 | Li et al. | |
| 6,838,863 B2 * | 1/2005 | Hazucha et al. | ............ 323/282 |
| 2002/0145886 A1 | 10/2002 | Stevens | |

FOREIGN PATENT DOCUMENTS

| | | |
|---|---|---|
| EP | 0398723 | 11/1990 |
| JP | 9-74741 | 3/1997 |
| JP | 9-163725 | 6/1997 |
| JP | 2001-78459 | 3/2001 |
| JP | 2003-116268 | 4/2003 |

OTHER PUBLICATIONS

Yuji Sayama et al., "Condenser Zetsuen ni yoru DC-DC Converter", The Institute of Electrical Engineers of Japan Handotai Denryoku Henkan Kenkyukai Shiryo, Jan. 29, 1994, vol. SPC-94, No. 15 to 24, pp. 27 to 36.

* cited by examiner

*Primary Examiner*—Adolf Berhane
(74) *Attorney, Agent, or Firm*—Rabin & Berdo, P.C.

(57) ABSTRACT

Switching elements M1, M2, M3 are connected in series between the positive and negative lines carrying DC current supplied through a rectifier circuit 2 from an AC power supply 1 or directly supplied from a DC power source. The switching elements M1, M2, M3 are on/off controlled by a high-frequency signal. An inductor L1 and a capacitor C1 are inserted between a connection node a and a load terminal c. An inductor L2 and a capacitor C2 are inserted between a connection node b and a load terminal d. The phases of on/off of the switching elements M1, M3 are the same, and the phase of on/off of the switching element M2 is opposite to them. Without using any transformer, not only insulation against DC but insulation against AC is adequately ensured.

6 Claims, 12 Drawing Sheets

CAPACITOR INSULATING POWER SUPPLY

FIELD OF ART

The present invention relates to a capacitor insulating power supply capable of achieving insulation between a power supply and a load.

BACKGROUND OF THE INVENTION

There are some power supplies containing a transformer therein for obtaining a voltage of a desired value. Such a transformer also serves to achieve insulation between a primary side and a secondary side.

On the other hand, since a transformer is heavy and large-sized, power supplies without need of any transformer are sometimes requested for miniaturization and weight saving.

In such a power supply having no transformer, it is generally difficult to keep insulation between the power supply side and the load side unlike in a power supply containing a transformer.

In the prior art, power supplies of a type in which capacitors are connected in series between the power supply side and the load side have been proposed (see U.S. Pat. No. 4,635,175, U.S. Pat. No. 6,144,565 and Japanese Unexamined Patent Publication No. 2003-116268).

However, the fact is that, in such a type of power supplies, insulation against DC can be achieved but sufficient insulation cannot be ensured against AC, namely, AC voltage of a commercial frequency or a switching frequency and AC current.

DISCLOSURE OF THE INVENTION

Therefore, an object of the present invention is to realize a power supply capable of sufficiently ensuring not only insulation against DC but insulation against AC.

A power supply according to the present invention comprises a first, second and third switching elements connected in series between positive and negative lines carrying DC current supplied through a rectifier circuit from an AC power supply or directly supplied from a DC power source, a switch control circuit for on/off controlling the first, second and third switching elements by a signal of a predetermined frequency, a first capacitor inserted between a load terminal and a connection node of the first switching element and the second switching element, and a second capacitor inserted between a load terminal and a connection node of the second switching element and the third switching element, and is characterized in that capacity values of the first capacitor and the second capacitor are the same, and that, in the switch control circuit, a phase of on/off of the first and third switching elements are the same, and the phase of on/off of the first and third switching element is opposite to a phase of on/off of the second switching elements.

According to this bridge arrangement, capacity values of the first capacitor and the second capacitor are the same and a symmetrical property of the circuit can be ensured, so that insulation between the power supply and the load can be achieved against DC and also against AC.

It is preferable that a first inductor is further inserted in series between the load terminal and the connection node of the first switching element and the second switching element, and a second inductor is further inserted in series between the load terminal and the connection node of the second switching element and the third switching element.

In this case, if induction values of the first inductor and the second inductor are the same, the symmetrical property of the circuit can be ensured, which is further preferable for obtaining insulation against AC.

If a period of time while the first and third switching elements are in an on-state is included in a period of time while a second switching element is in an off-state and the former period of time is shorter than the latter period of time, there is a period of time while all of the first, second and third switching elements are in the off-state, which is preferable in respect of realizing a zero switch.

As abovementioned, according to a capacitor insulating power supply of the present invention, insulation between the power supply side and the load side can be achieved against DC and also against AC. Therefore, insulation between the input and the output can be kept without using any transformer. As a result, an optimum power supply can be provided to a computer, various kinds of communication apparatus and the like.

Further, according to this capacitor insulating power supply, a zero switch can be simply realized and therefore, a power supply of little noise can be provided.

PREFERRED EMBODIMENT OF THE INVENTION

Now, embodiments of the present invention will be described in detail with reference to the appended drawings.

Figure 1:
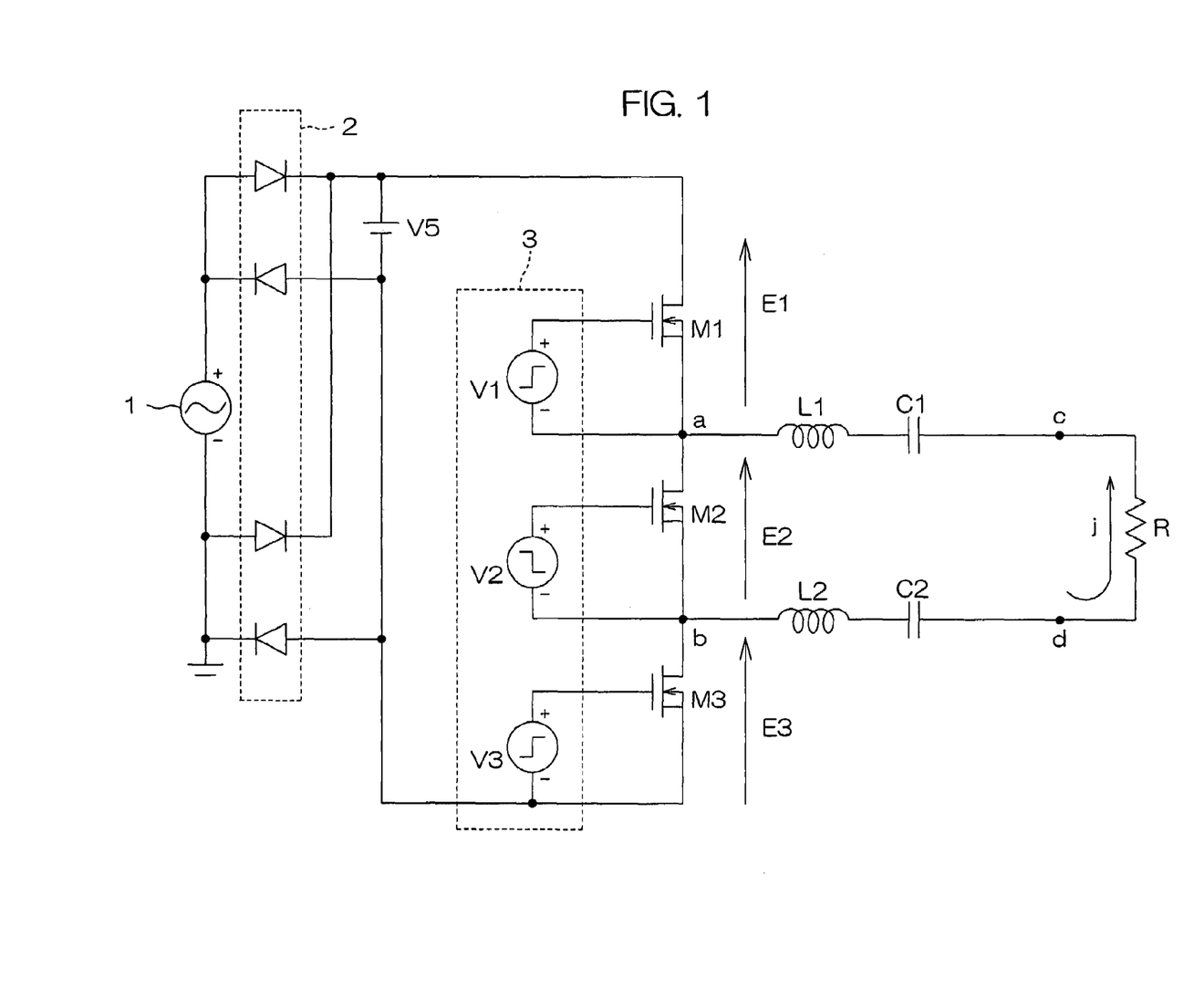
FIG. 1 is a circuit diagram of a capacitor insulating power supply according to the present invention.

FIG. 1 is a circuit diagram of a capacitor insulating power supply according to the present invention.

The AC voltage of a commercial AC power supply 1 is converted to a DC voltage by a rectifier circuit 2. In FIG. 1, the rectifier circuit 2 is a full-wave rectifier circuit, but it may be a half-wave rectifier circuit.

Connected to the positive and negative sides after the DC conversion are a first, second and third switching transistors M1, M2, M3 in series.

And a switch control circuit 3 is provided for on/off controlling the first, second and third switching transistor M1, M2 and M3 by a signal of a predetermined frequency, for example, 100 kHz. The switch control circuit 3 controls on/off of the switching transistor M1, M2 and M3 by applying a voltage signal to a gate electrode of each of the switching transistors M1, M2 and M3.

A connection node between the first switching transistor M1 and the second switching transistor M2 is designated as a, and a connection node between the second switching transistor M2 and the third switching transistor M3 is as b. And load terminals are designated as c, d.

A first inductor L1 and a first capacitor C1 are inserted in series between the connection node a and the load terminal c. A second inductor L2 and a second capacitor C2 are inserted in series between the connection node b and the load terminal d. And a load resistance R is connected to the load terminal c and the load terminal d.

Figure 2:
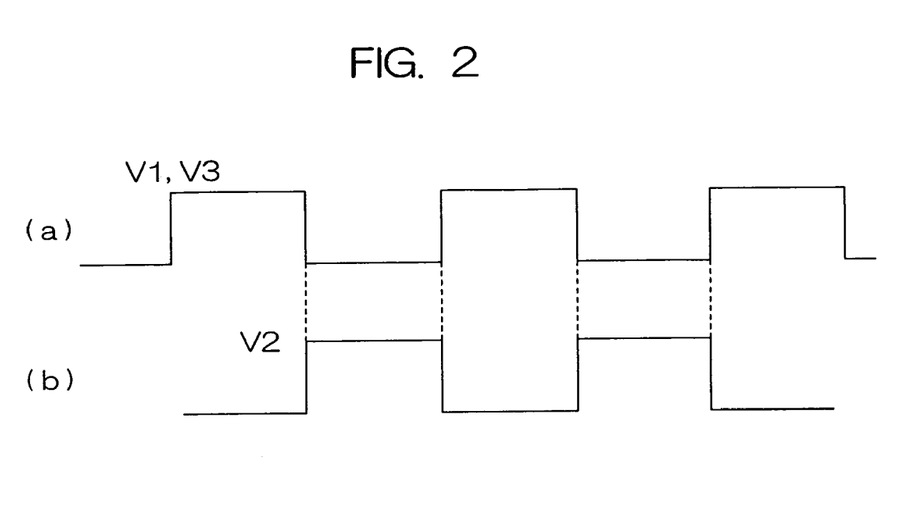
FIG. 2 is a waveform chart of a control signal of a switch control circuit 3.

FIG. 2 is a waveform chart of a control signal of a switch control circuit 3. As shown in FIG. 2, the phases of voltage signals V1, V3 causing the switching transistors M1, M3 to conduct are the same and the phase of a voltage signal V2 causing the switching transistor M2 is opposite to them.

The operations of the abovementiond capacitor insulating power supply are as follows. When the switching transistors M1, M3 conduct, the capacitors C1, C2 are charged. And when the switching transistor M2 conducts, the electric charges charged to the capacitors C1, C2 are discharged so that current i flows through a load R. Thereby, DC current is supplied to the load R.

If the conduct state of the switching transistors M1, M3 and the conduct state of the switching transistor M2 are momentarily changed-over, the switching transistors are excessively loaded. Therefore, it is preferable to provide a time when both of the switching transistors M1, M3 and the switching transistor M2 do not conduct during the changeover time. For example, it is preferable to shorten the conducting time of the voltage signals V1, V3 causing the switching transistors M1, M2 to conduct and thereby to provide a time when the voltage signals V1, V2, V3 are unconductive, as shown in FIG. 3.

Figure 3:
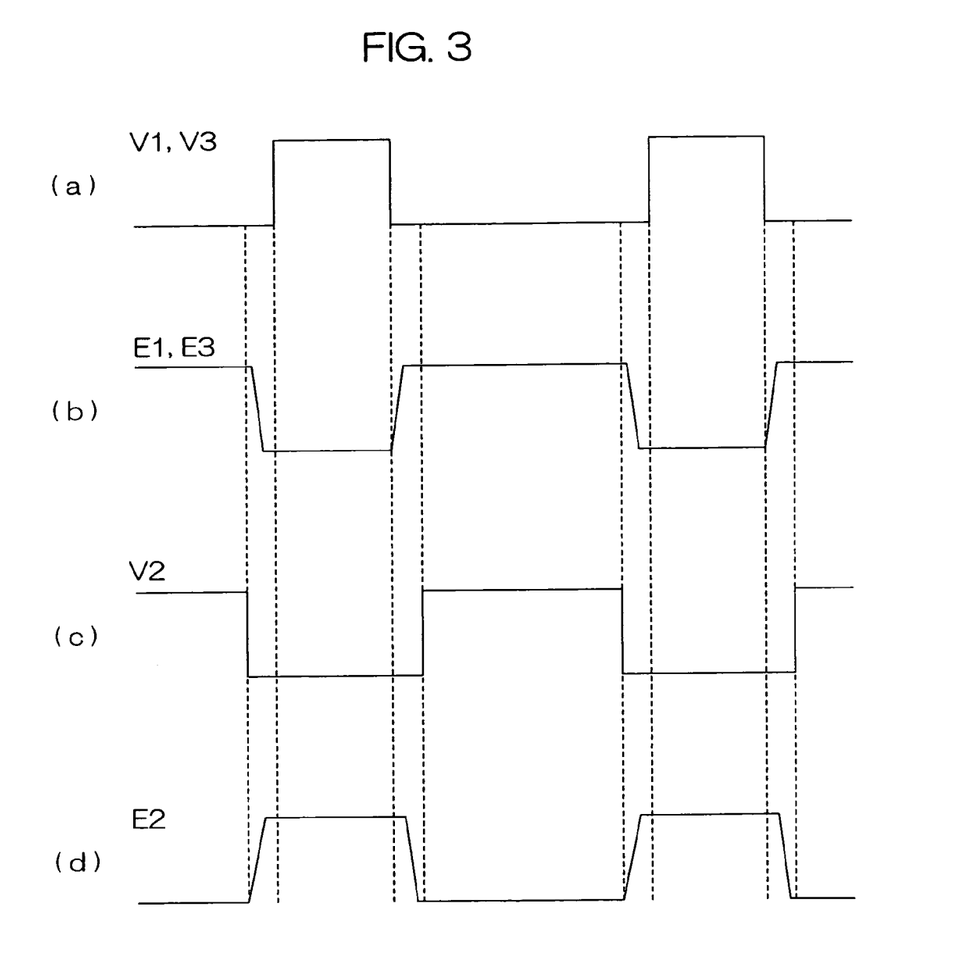
FIG. 3 is a waveform chart of a control signal of a switch control circuit 3.

FIG. 3 is a waveform chart of a control signal of a switch control circuit 3. With the waveforms of the voltages V1, V2, V3, the waveforms of voltages E1, E2, E3 between drain and source of the switching transistors M1, M2, M3 are shown. As shown in FIG. 3, during the time when the voltages V1, V2, V3 are unconductive, the switching transistors are turned on after the voltages E1, E2, E3 become zero, so that the switching transistors can be prevented from being excessively loaded.

As abovementioned, the capacitor insulating power supply according to the present invention, the load R and the commercial AC current power supply 1 can be insulated not only in DC but in the frequency, switching frequency and the like of the commercial AC current power supply 1. That is, both of insulation against DC and insulation against AC can be achieved between the power supply and the load.

This fact can be proved by connecting a resistance between the load R and the earth and confirming that neither DC current nor AC current flows through the resistance or that if flows, it is too small current to give any influence to human bodies, as described in the following Examples.

An embodiment of the present invention has been described in the above, but embodiments of the present invention are not limited to the same. For example, the present invention can be applied to a DC input type capacitor insulating power supply having neither AC power supply 1 nor rectifier circuit 2 in FIG. 1. Besides, the present invention can be applied to an AC input type capacitor insulating power supply having no rectifier circuit 2 and directly connected to the AC power supply 1. Embodiments of the present invention can be variously modified within the scope of the invention.

EXAMPLE 1

Figure 4:
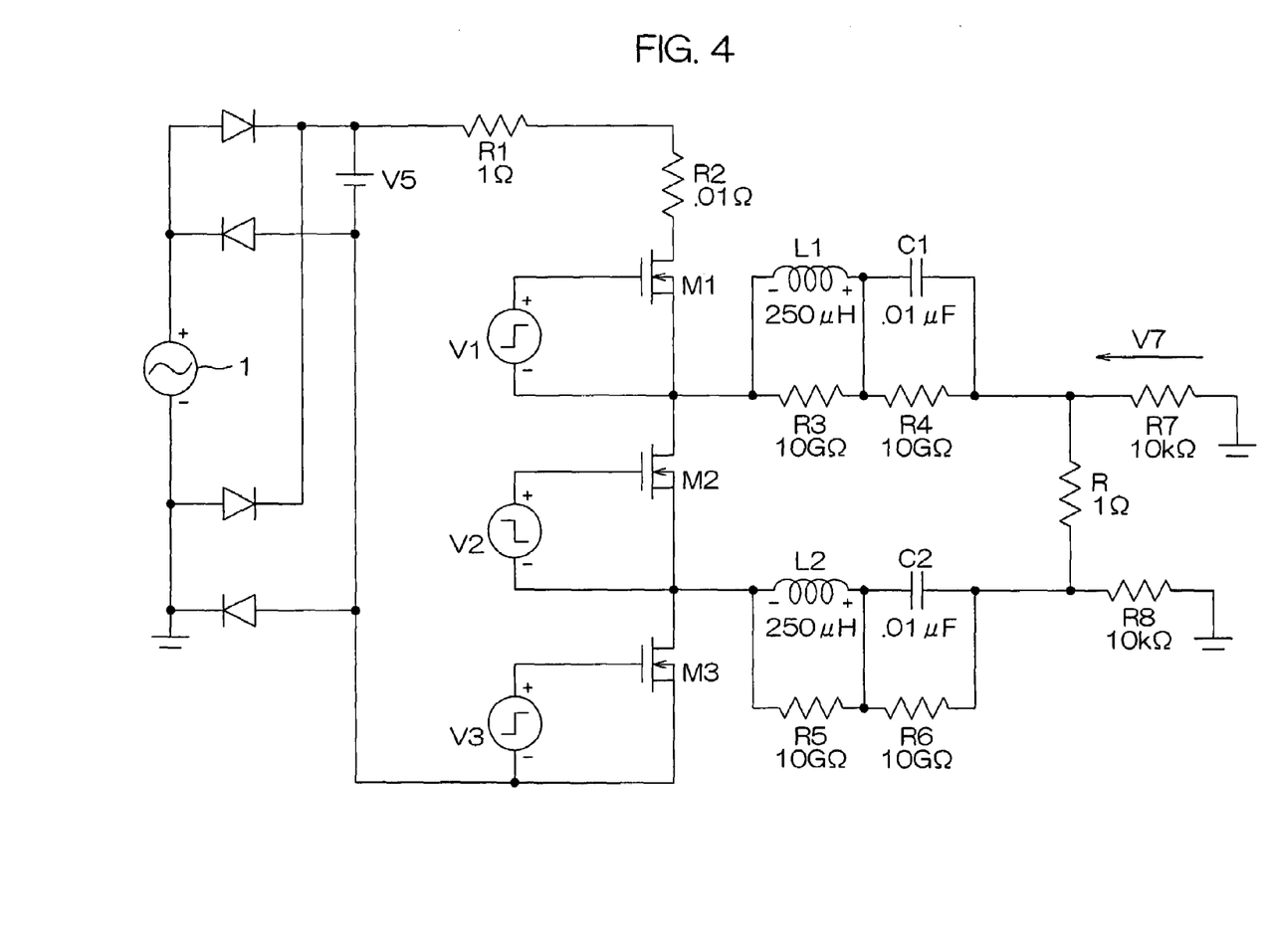
FIG. 4 is a circuit diagram for simulation of a capacitor insulating power supply used for proving the effects of the present invention.

FIG. 4 is a circuit diagram used for proving the effect of the present invention. The voltage and current waveforms of each part were calculated by inputting these circuit arrangements and circuit constants in a computer and using a circuit analysis software.

This circuit is of a type of AC input and DC output and the same circuit as that of the capacitor insulating power supply 1 of FIG. 1. Resistances R1, R2 are inserted between the rectifier circuit 2 and the switching transistor M1. However, they are of so small values respectively that they can be ignored. Further, parallel resistances R3, R4 are provided in the inductor L1 and the capacitor C1 respectively. However, they are constants necessary for setting the circuit analysis software and of so large values that they can be ignored. Similarly, parallel resistances R5, R6 are of so large values that they can be ignored.

The voltage of the AC power supply 1 was 350V at peak and the frequency was 50 Hz.

The load resistance R was 1Ω. However, in order to measure the current flowing between the load resistance R and the earth, 10 kHz resistances R7, R8 simulating human bodies respectively were connected between the load resistance R and the earth. The voltage of the resistance R7 was represented as V7.

The inductors L1, L2 comprised 250 μH inductors respectively and the capacitors C1, C2 comprised 0.01 μF capacitors respectively. The on-off frequency f of the switch control circuit was 100 kHz. These constants satisfy the following condition:

$$f > 1/2\pi \sqrt{(LC)}$$

This formula is written as L1=L2=L, C1=C2=C.

Figure 5:
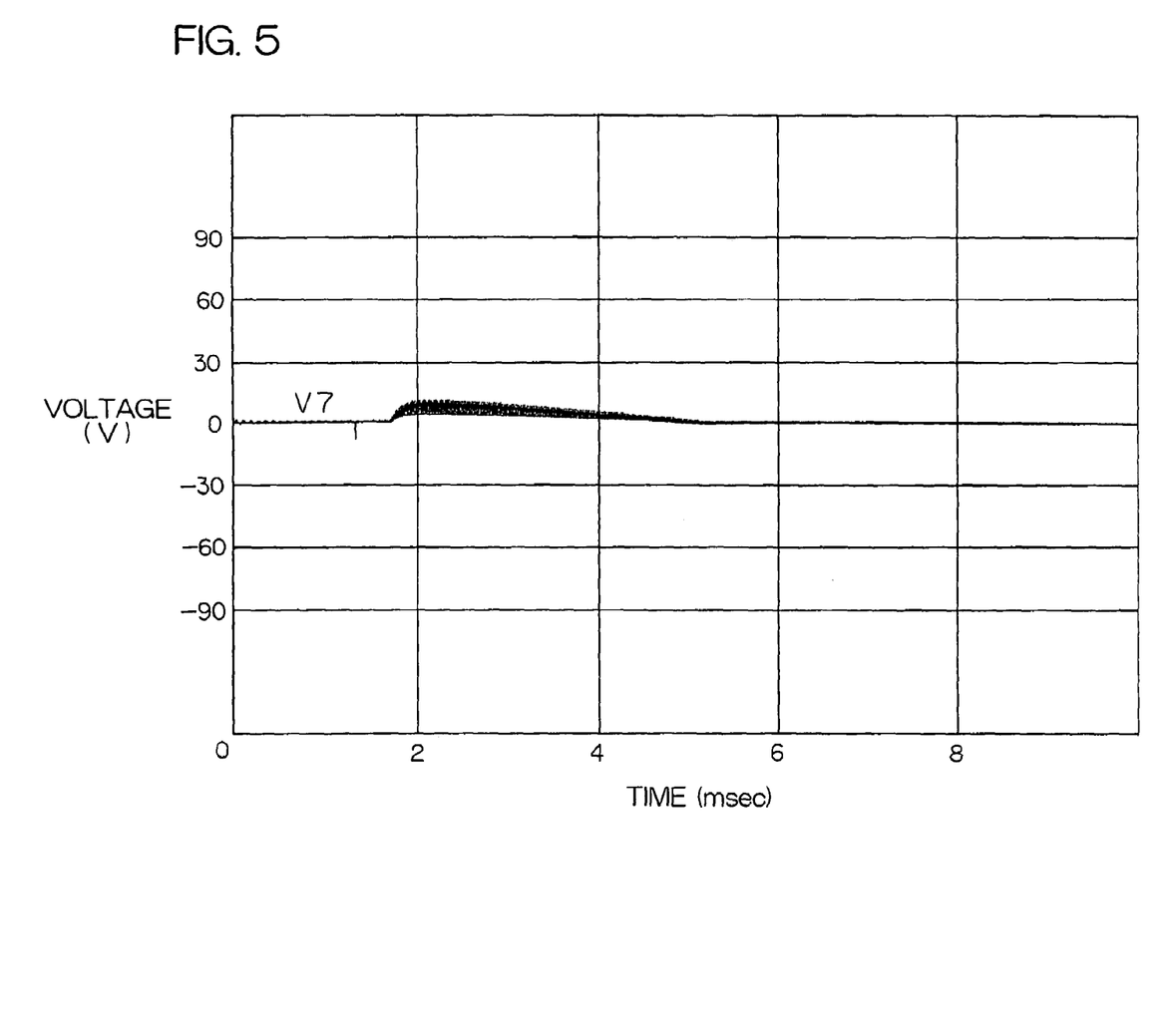
FIG. 5 is a graph showing the voltage waveform change of both terminal voltage V7 of a resistance R7 after the input was on in the circuit of FIG. 4.

A graph showing the voltage waveform of both terminal voltage V7 of the resistance R7 after the AC input was on is shown in FIG. 5.

In the graph of FIG. 5, the unit of the voltage in the ordinate is volt and the unit of the time in the abscissa is msec.

According to the graph of FIG. 5, the voltage V7 rose 2 msec after the power supply rose, but the voltage was not higher than 10V at the highest. Therefore, a man receives no electrical shock and it can be said that insulation between the input and the output is ensured.

In such a manner, all of the inductors L1, L2 and the capacitors C1, C2 have symmetrical properties respectively, and insulation between the power supply and the load can be substantially perfectly achieved. And even if the abovementioned condition is not satisfied, insulation between the power supply and the load can be achieved at a practically sufficient level.

COMPARATIVE EXAMPLE 1

Figure 6:
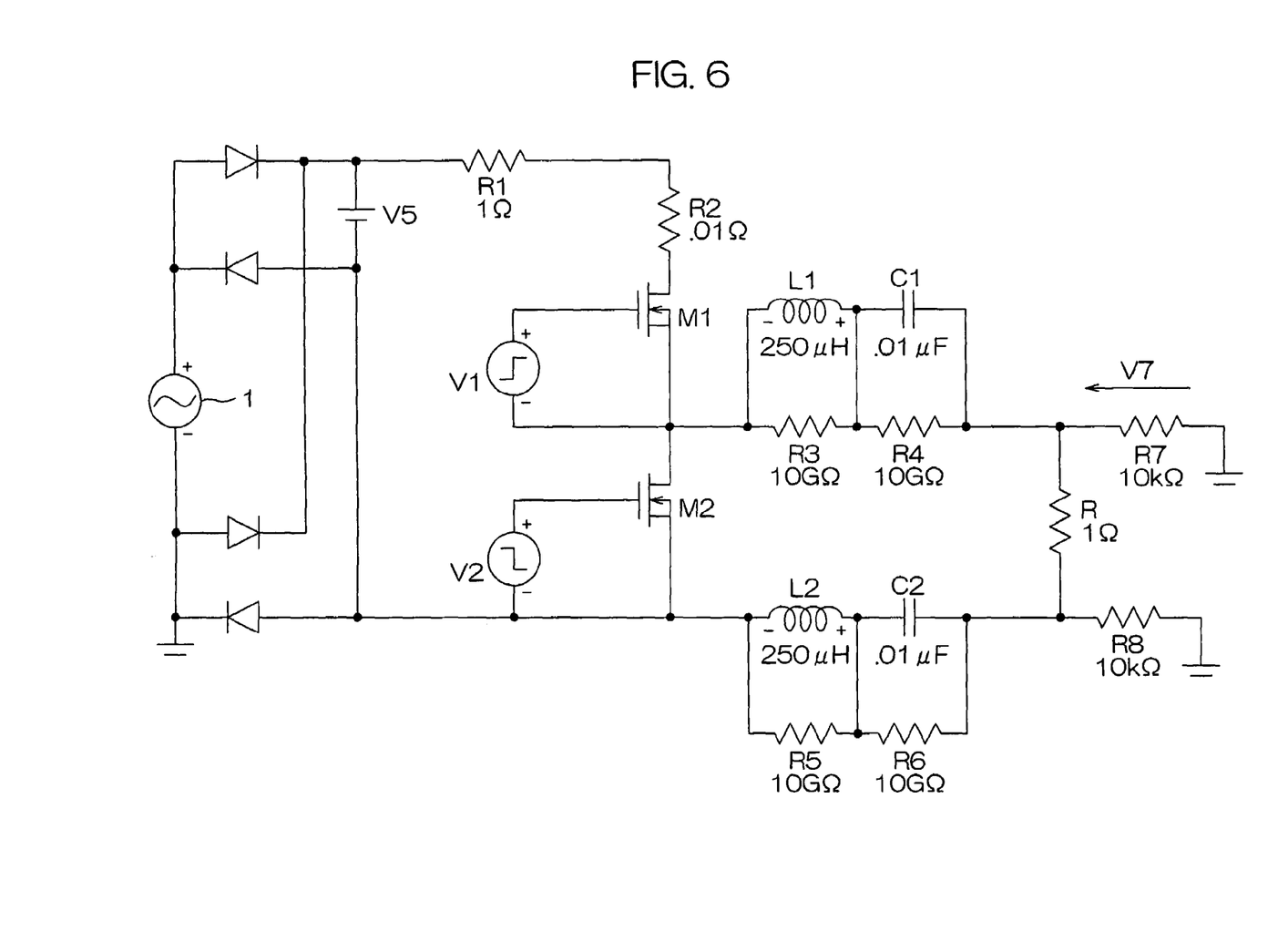
FIG. 6 is a circuit diagram of a capacitor insulating power supply according to a comparative example in which a third switching element M3 was omitted.

As a comparative Example, as sown in FIG. 6, a circuit was supposed in which the third switching transistor M3 was short-circuited. The circuit constants were the same as those of the circuit of FIG. 4.

Figure 7:
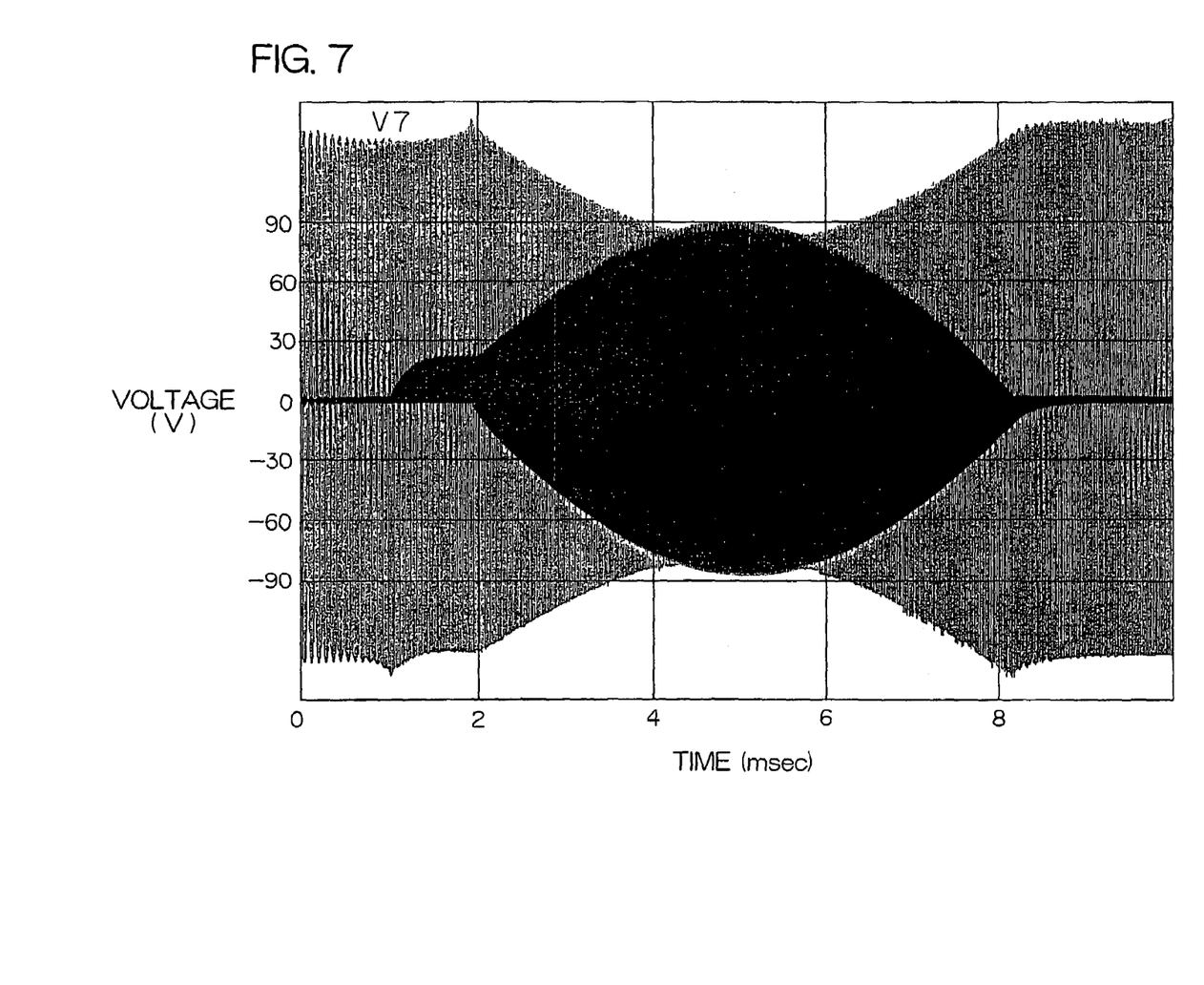
FIG. 7 is a graph showing the voltage waveform change of both terminal voltage V7 of a resistance R7 after the input was on in the circuit of FIG. 6.

FIG. 7 is a graph showing the voltage waveform both terminal voltage V7 of the resistance R7 after the AC input was on. Portions of dark color indicate portions of high time-pulse-duty-ratio and portions of light color indicate portions of surge voltages of low time-pulse-duty-ratio.

According to the graph of FIG. 7, the voltage V7 suddenly rose after the power supply rose, and in addition shows large voltage values. It cannot be said that insulation between the input and the output has been ensured and a man is at risk of an electrical shock if he touches the load R.

COMPARATIVE EXAMPLE 2

A capacitor insulating power supply was supposed in which the values of the inductors L1, L2 were set to be asymmetrical, and the voltage waveforms of both terminal voltage V7 of the resistance R7 were calculated.

The capacitors C1, C2 were 0.01 µF respectively. And the inductor L1 was 350 µH and the inductor L2 was 150 µH with the sum (L1+L2) being the same as that of the preceding example.

Figure 8:
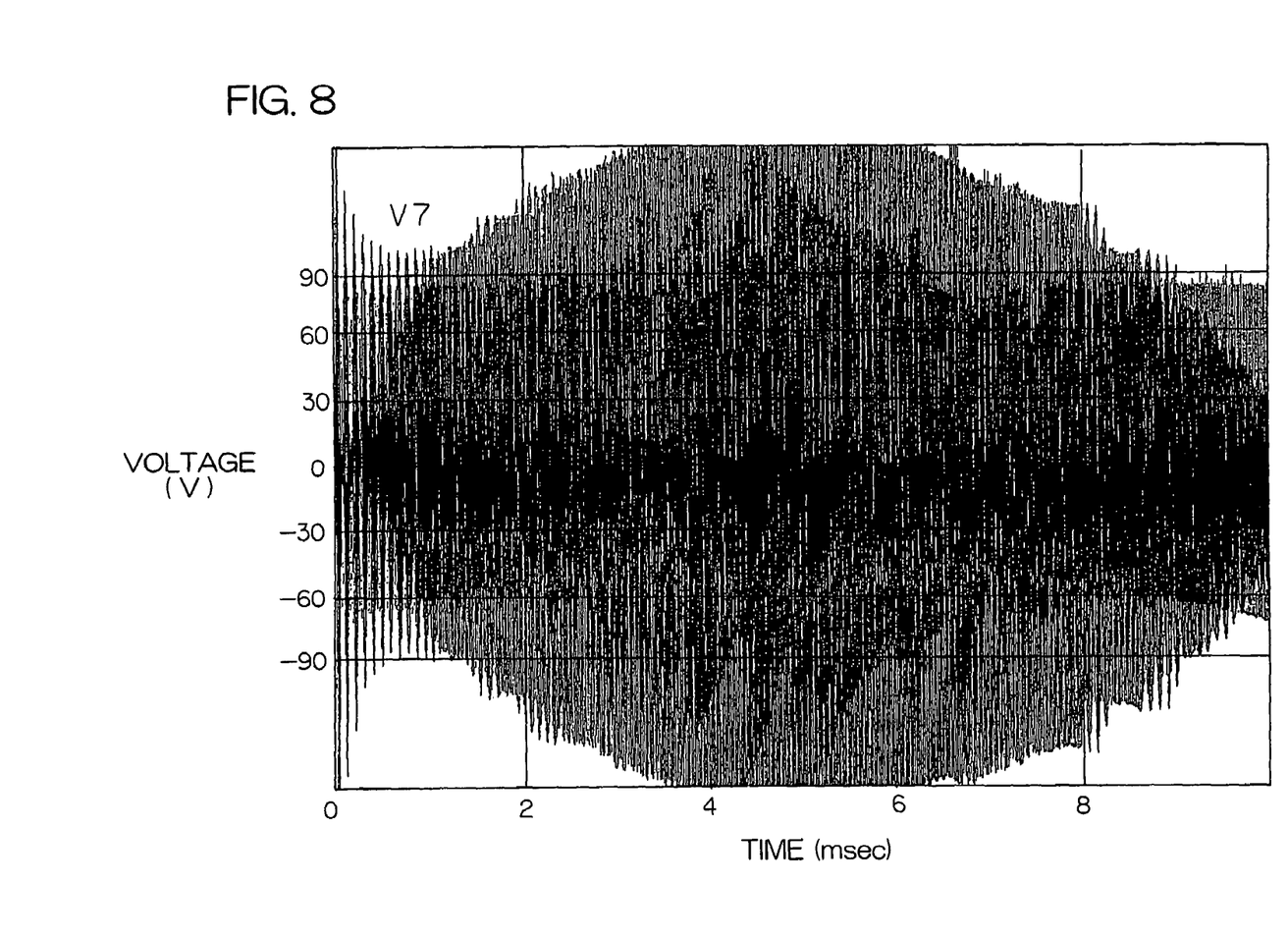
FIG. 8 is a graph showing the voltage waveform change of both terminal voltage V7 of a resistance R7 after the input was on in the case that the values of inductors L1, L2 were set asymmetrical.

FIG. 8 is a graph showing the voltage V7 of this circuit. As seen from this graph, by setting the values of the inductors L1, L2 to be asymmetrical, the voltage V7 became to show a large voltage value beyond 150 V, in comparison with that of Example 1 shown in FIG. 5. It cannot be said that insulation between the input and the output has been ensured and a man is at risk of an electrical shock if he touches the load R.

COMPARATIVE EXAMPLE 3

A capacitor insulating power supply was supposed in which the values of the capacitors C1, C2 were set to be asymmetrical, and the voltage waveforms of both terminal voltage V7 of the resistance R7 were calculated.

Figure 9:
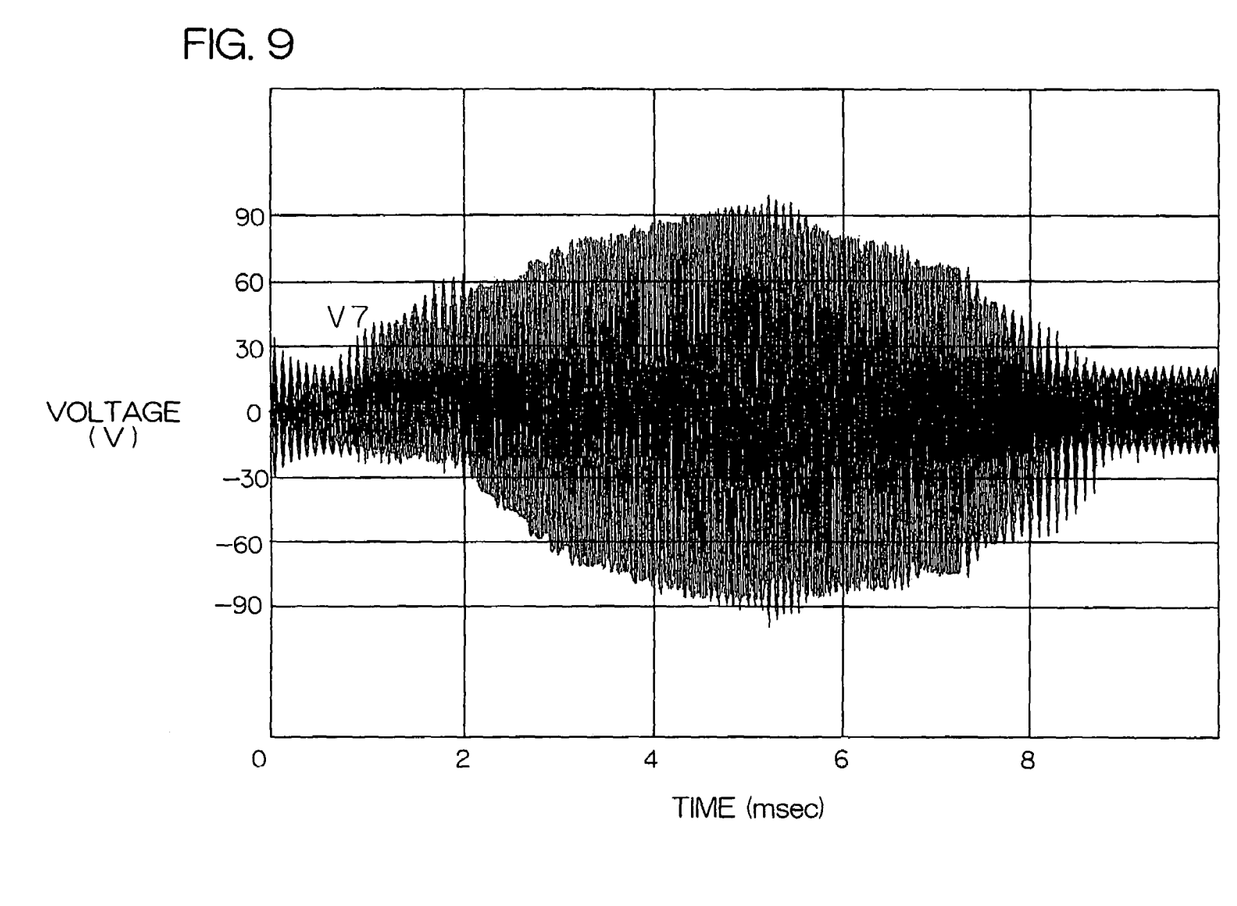
FIG. 9 is a graph showing the voltage waveform change of both terminal voltage V7 of a resistance R7 after the input was on in the case that the values of capacitors C1, C2 were set asymmetrical.

FIG. 9 is a graph showing the voltage V7 of this circuit in which the inductors L1, L2 were 250 µH and the capacitors C1, C2 were 0.013 µF and 0.008 µF respectively. Here, the serial composite capacity of the capacitors C1, C2 was set to be the same as that of the capacitors C1, C2 of FIG. 2.

As seen from the graph of FIG. 9, by setting the values of the capacitors C1, C2 to be asymmetrical, the voltage V7 became to show a large voltage value near 90V, in comparison with that of Example 1. It cannot be said that insulation between the input and the output has been ensured and a man is apt to receive an electrical shock if he touches the load R.

EXAMPLE 2

Now, shown will be a simulation example of a case of f>>½π√(LC) (>>means "much larger").

The inductors L1, L2 were 50 µH respectively and the capacitors C1, C2 were 0.01 µF respectively. The on-off frequency f of the switch control circuit was 100 kHz as above.

Figure 10:
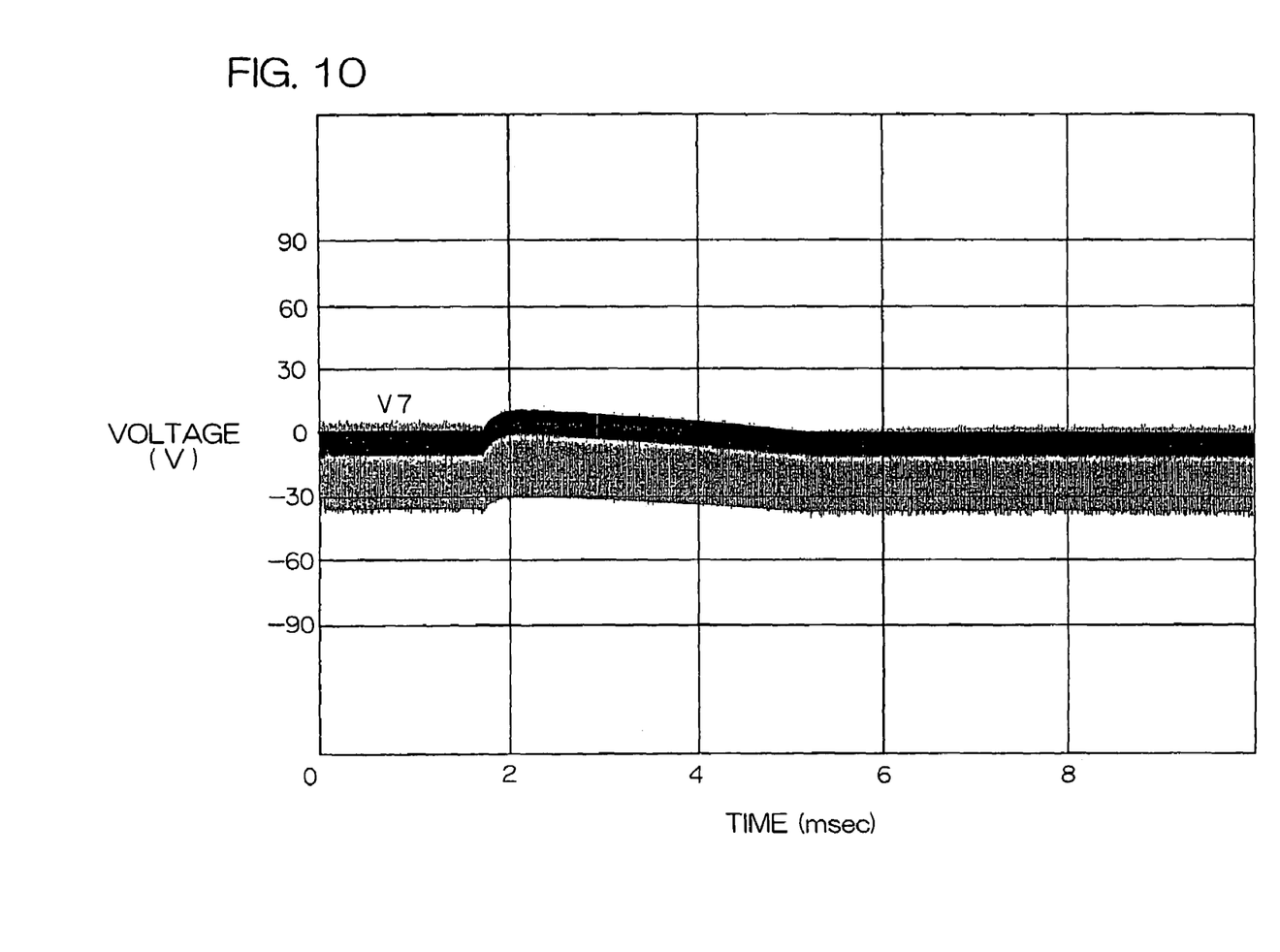
FIG. 10 is a graph showing the voltage waveform change of both terminal voltage V7 of a resistance R7 after the input was on in the case that the oscillating condition was not satisfied.

FIG. 10 is a graph showing the voltage waveform of the voltage V7 after the AC input was on in this case.

According to the graph of FIG. 10, the voltage V7 was not higher than 30V after the power supply rose. Therefore, the voltage value is larger than that of FIG. 5, but it is a relatively safe value. Especially, the voltage value of the portions of dark color (portions of high time-pulse-duty-ratio) is low and it can be said that insulation between the input and the output is ensured.

EXAMPLE 3

Figure 11:
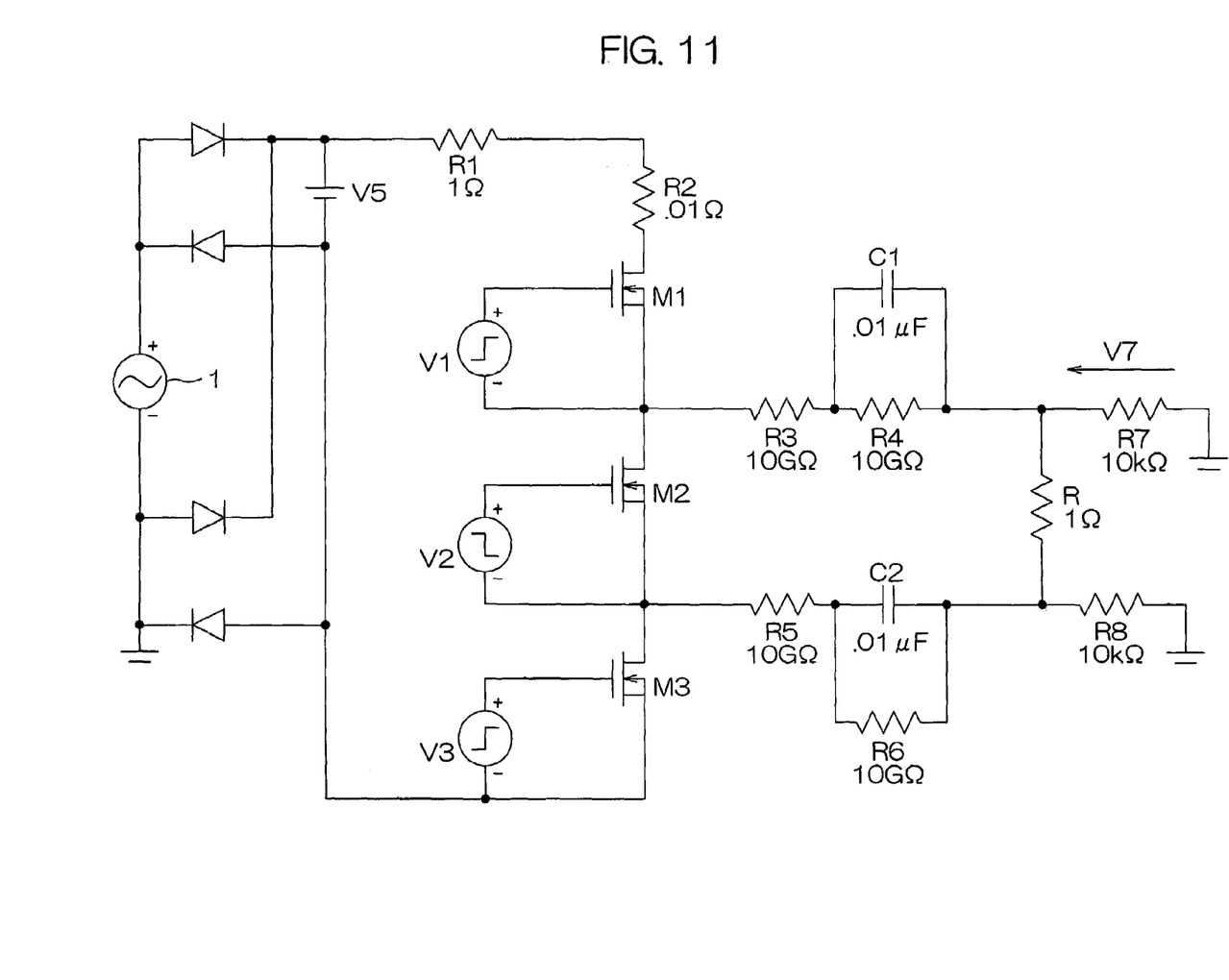
FIG. 11 is a circuit diagram of a capacitor insulating power supply in which inductors L1, L2 were omitted.

In FIG. 11, a circuit is shown in which inductors L1, L2 are omitted and only capacitors C1, C2 are provided.

Figure 12:
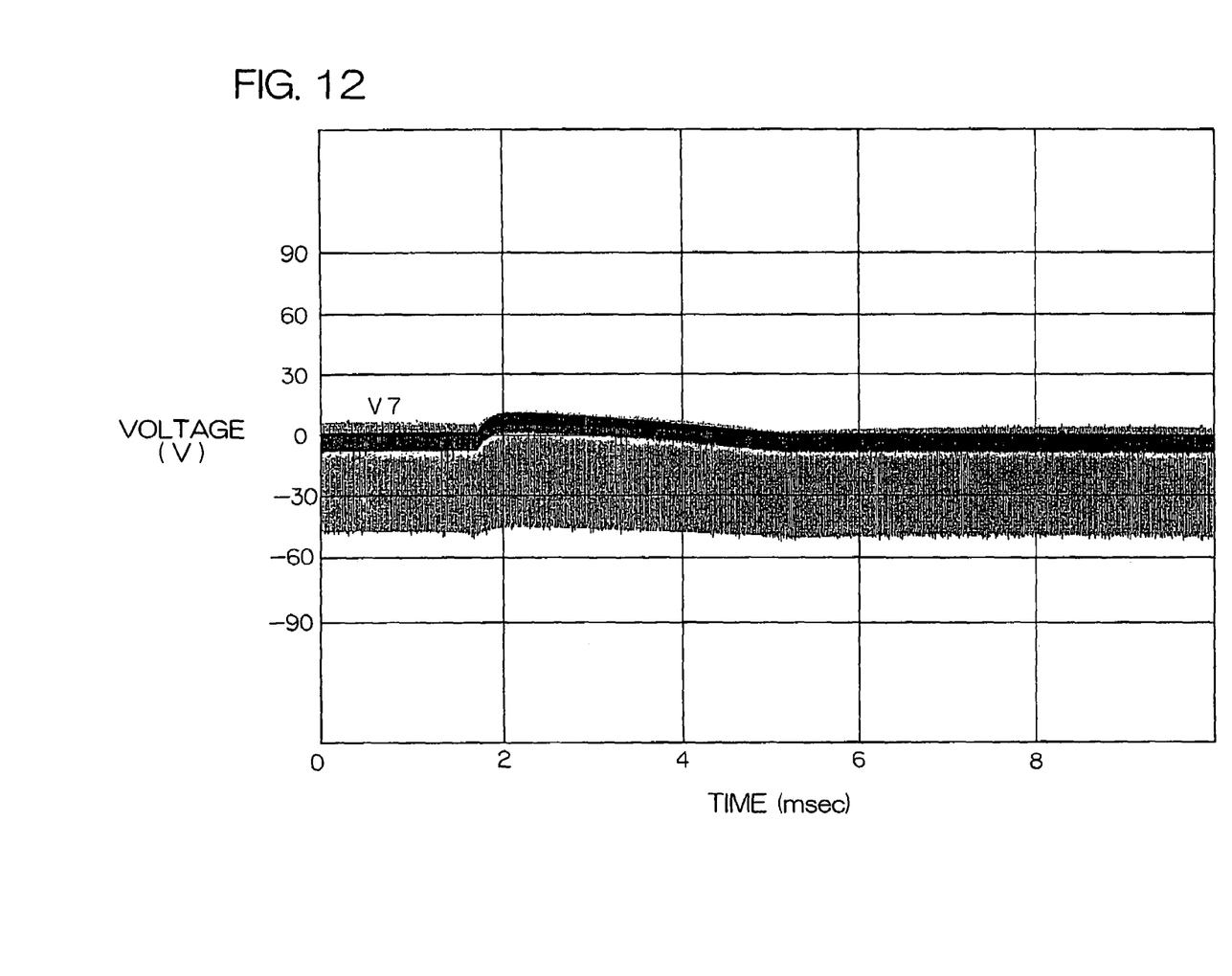
FIG. 12 is a graph showing the voltage waveform change of both terminal voltage V7 of a resistance R7 after the input was on in the case that inductors L1, L2 were omitted.

The result of calculation of this case is shown in FIG. 12. The values of C1, C2 were 0.01 µF respectively.

FIG. 12 is a graph showing the voltage waveform the voltage V7 in lapse of time after the AC input was on. According to the graph of FIG. 12, a tendency similar to that of FIG. 10 is shown and the voltage V7 after the power supply rose is not higher than 50V. Therefore, the voltage value is relatively large in comparison with that of FIG. 10, but it is a relatively safe value. Especially, the voltage value of the portions of dark color (portions of high time-pulse-duty-ratio) is low and it can be said that insulation between the input and the output is ensured.

What is claimed is:

1. A capacitor insulating power supply comprising:
a first, second and third switching elements connected in series between positive and negative lines carrying DC current supplied through a rectifier circuit from an AC power supply or directly supplied from a DC power source;
a switch control circuit for on/off controlling the first, second and third switching elements by a signal of a predetermined frequency;
a first capacitor inserted between a load terminal and a connection node of the first switching element and the second switching element, and
a second capacitor inserted between a load terminal and a connection node of the second switching element and the third switching element, in which
capacity values of the first capacitor and the second capacitor are the same;
in the switch control circuit, a phase of on/off of the first and third switching elements are the same; and
the phase of on/off of the first and third switching elements is opposite to a phase of on/off of the second switching element.

2. A capacitor insulating power supply according to claim 1, in which a first inductor is further inserted in series between the load terminal and the connection node of the first switching element and the second switching element, and a second inductor is further inserted in series between the load terminal and the connection node of the second switching element and the third switching element.

3. A capacitor insulating power supply according to claim 2, in which capacity values of the first capacitor and the second capacitor are the same, and induction values of the first inductor and the second inductor are the same.

4. A capacitor insulating power supply according to claim 1, in which a period of time while the first and third switching elements are in an on-state is included in a period of time while the second switching element is in an off-state, and the former period of time is shorter than the latter period of time.

5. A capacitor insulating power supply according to claim 2, in which a period of time while the first and third switching elements are in an on-state is included in a period of time while the second switching element is in an off-state, and the former period of time is shorter than the latter period of time.

6. A capacitor insulating power supply according to claim 3, in which a period of time while the first and third switching elements are in an on-state is included in a period of time while the second switching element is in an off-state, and the former period of time is shorter than the latter period of time.

* * * * *